United States Patent [19]

Feldman

[11] 3,997,223
[45] Dec. 14, 1976

[54] APPARATUS AND METHOD FOR REJUVENATING CATHODE RAY TUBES
[75] Inventor: Harold Feldman, Skokie, Ill.
[73] Assignee: Dynascan Corporation, Chicago, Ill.
[22] Filed: Apr. 30, 1975
[21] Appl. No.: 573,369
[52] U.S. Cl. .................................. 316/2; 316/28
[51] Int. Cl.² ........................................ H01J 9/50
[58] Field of Search .......................... 316/2, 27, 28
[56] References Cited
UNITED STATES PATENTS
2,774,645  12/1956  Batchelor, Jr. ........................ 316/2
2,783,116  2/1957  Schaedler et al. ..................... 316/2

Primary Examiner—Richard B. Lazarus
Attorney, Agent, or Firm—Wallenstein, Spangenberg, Hattis & Strampel

[57] ABSTRACT

The cathode material of a black and white or color cathode ray tube is rejuvenated by apparatus and a method which initially supplies heater voltage to the heater filament prior to the application of a source of positive voltage between the control grid and the cathode, to pre-heat the cathode to a rejuvenation temperature effective upon flow of appreciable cathode current to rejuvenate the cathode material. Then, upon operation of a depressible push-button a source of positive voltage is connected between the control grid and the cathode to effect said flow of appreciable cathode current and the simultaneous removal of the heater filament voltage from the heater filament, so that the time interval of large cathode current flow depends solely upon the thermal characteristics of the cathode structure.

9 Claims, 1 Drawing Figure

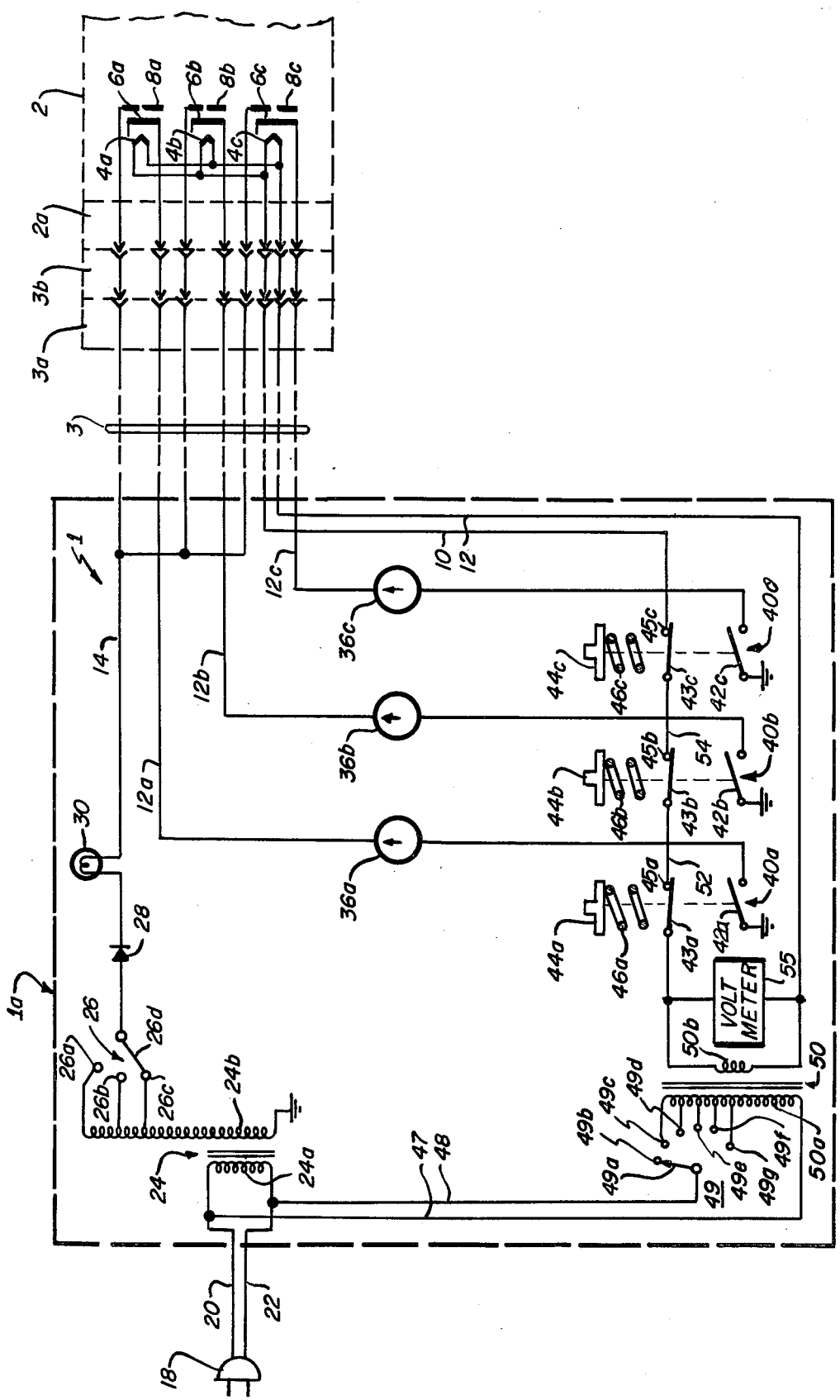

APPARATUS AND METHOD FOR REJUVENATING CATHODE RAY TUBES

BACKGROUND OF INVENTION

This invention relates to a method and apparatus for rejuvenating the cathode of an electron gun of a cathode ray tube where the usuable cathode emission thereof has dropped to an unacceptable level.

Cathodes of cathoode ray tubes commonly comprise an open end cylindrical body coated with an oxide which emits electrons when heated to an elevated temperature. These cathode structures are generally heated by a filament contained within the cylindrical cathode structure through which filament current is passed to generate the heat transmitted to the surrounding cathode structure. The end wall of the cylindrical cathode structure is mounted in confronting relationship to an apertured electrode referred to as a control grid to which, in the normal operation of the cathode ray tube, a varying amplitude negative signal voltage is coupled which varies the intensity of the electron beam passing through the control grid aperture. The electron emission of the cathode frequently reduces to an unacceptable level after the cathode ray tube has been used for a considerable period of time. A number of techniques for rejuvenating a worn-out cathode have been heretofore developed. However, neither the causes of the wear-out phenomenon of the cathodes nor the processes by which the cathodes are rejuvenated are fully understood.

While several techniques for rejuvenating similar oxide coated cathodes used in small signal amplifying vacuum tubes have been known for many years since the early days of radio, there was little economic value in cathode rejuvenation prior to the need to replace the expensive cathode ray tubes of television receivers. Since the early days of television, however, various methods have come into use for increasing the emission of a poor electron emitting cathode. In one such method, the heater filament volatge is increased to a value above normal voltage by means of a step-up booster transformer which must be premanently attached to the cathode ray tube base. This method provides an extension of useful life varying from 3 months to a year. However, there are some drawbacks associated with the use of this method which have increased with the advent of color television cathode ray tube and recent advancements which supply the heater with direct current derived from a high frequency power supply or the horizontal output transformer, which makes useless the provision of a simple AC operated booster transformer for cathode rejuvenation. Perhaps the greatest disadvantage in the use of this method is the need to maintain for sales to customers a large inventory of differently wired booster units for the various cathode ray tube models. A further disadvantage of using such a rejuvenation method is the increased stress put on the heater filaments by the sustained higher than normal voltages required which increases the risk of heater filament failure and the possible damaging of the cathode or cathodes by the continuous above normal cathode temperatures produced in the cathode or cathodes which do not require rejuvenation.

Another technique for cathode rejuvenation is one which does not involve the permanent attachment of a cathode emmission restoring unit to the cathode ray tube. In this method, the cathode ray tube involved is temporarily disconnected from the chassis circuitry and the control grid of a defective electron gun is temporarily connected to a source of high positive voltage while the heater filament thereof is connected to a normal or above normal voltage to cause a very much greater than normal cathode current to flow, which somehow removes emission inhibiting contaminants. Unfortunately, unless this process is very carefully controlled, the cathode can easily be damaged, and instead of improving performance the emission capability of the cathode is lowered or destroyed. A manually operative switch is generally provided to control the period during which the control grid and heater filament voltages are simultaneously applied. However, the operator has no way of knowing the proper period to close the switch to obtain a safe and successful rejuvenation operation, since the period for a switch closure to obtain a successful and safe rejuvenation varies with each cathode structure involved.

One variation of the rejuvenation technique now being described is to place a current limiting switch in the path of flow of cathode current which switch automatically opens when a given limiting current is reached. A further variation on this technique is to rejuvenate the cathode by progressively increasing the heater current until the cathode current reaches a desired level as viewed on a current indicating meter. When the cathode current reaches such level, a switch is operated to disconnect the heater voltage. It is apparent, however, that in all these variations of the technique of rejuvenation just discussed, there is still a simultaneous application of control grid voltage and heater voltage which can create condition which can damage the cathode and result in less than optimum rejuvenating results.

In the attempt to control the rejuvenation process, it seemed that some kind of timing cycle would have to be employed, or some other means be devised for limiting the total amount of energy available for rejuvenation. A convenient and fairly inexpensive way to accomplish this is to use the capacitor discharge method of rejuvenation. In this way a high voltage can be applied to that a very strong electric field is available for reaching into the cathode below the inactive top surface to get the rejuvenation process started. An extremely large current will flow as emission begins to discharge the capacitor, but the limited amount of energy available in the capacitor reduces the possibility that the cathode will be destroyed. The possibility of damaging the cathode can be further reduced by offering several degrees of rejuvenation, and increasing the amount of energy available in each higher degree. This is accomplished by either increasing the size of the capacitor or the voltage to which it is charged. This technique proved to be an effective way of reducing rejuvenation hazards to picture tubes while still achieving a fairly effective rejuvenation process. However, it was recognized that the older and more hazardous rejuvenation methods had a far longer lasting result.

SUMMARY OF INVENTION

In accordance with one of the features of the present invention, the rejuvenation process is designed so that it is impossible to continuously supply both the heater filament voltage and the control grid rejuvenation voltage, which it is found virtually eliminates the possibility of an error by the user which might result in fatal damage to the cathode ray tube. This result is achieved by first pre-heating the cathode, and then initiating the rejuvenation cycle preferably by means of a spring-biased push button or similar control member which when operated applies the high rejuvenation voltage to the control grid and simultaneously removes the heater filament voltage. This permits a high (but limited) rejuvenation current to begin flowing immediately as the rejuvenation control member is operated, and permits the current to flow only as long as the cathode retains sufficient heat to maintain the temperature required for emission. The rejuvenation cycle is therefore automatically terminated when the cathode cools below the point at which emission can be sustained. A meter is preferably provided which indicates the magnitude of cathode current flow so the control member is released when the cathode current reaches or drops below a given maximum level. Generally, the control member is operated for from 2–10 seconds to achieve the result, and since no heater voltage is applied to the heater filament during operation of the rejuvenation control member, as above explained, no hazard results if the control member is held for a longer period since the cathode temperature will continue to decrease resulting in zero cathode current.

DESCRIPTION OF DRAWING

The drawing shows a circuit diagram of a preferred exemplary circuit for rejuvenating a color television cathode ray tube.

DESCRIPTION OF EXEMPLARY EMBODIMENT OF INVENTION

In the drawing there is shown a cathode ray tube rejuvenating circuit 1 which will generally constitute part of a greater overall circuit (not shown) used to test the various characteristics of a cathode ray tube. (For example, such equipment commonly performs cathode emission and tacking, leakage, life and focus tests.) The overall circuitry is generally contained within a housing identified by a dashed line 1a having various meters and controls on the outer face thereof, some of which are shown as part of the circuit 1 to be described. There is generally extending from the housing of the cathode ray tube test and rejuvenating unit a cable 3 having on the end thereof a socket connector 3a (having generally up to 12 socket terminals) and associated conductors extending to various parts of the cathode ray tube test and rejuvenating circuitry necessary to carry out the various test and rejuvenating operations involved. Since the plug connectors of cathode ray tubes of different design have a variety of configurations, it is necessary to provide a set of removable plug-in adapters, like unit 3b, which are each removably insertable into the socket terminals of the socket connector 3a so that the plug connectors of various cathode ray tubes can be electrically connected to the cable socket connector 3a and associated circuitry. In the drawing, reference numeral 2a indentifies the plug connector 2 of a cathode ray tube 2 having three electron guns including various heater filaments 4a, 4b and 4c connected in parallel and electrically coupled through terminals of the cathode ray tube plug connector 2a adapter unit 3b and socket connector 3a to a pair of conductors 10 and 12 extending to a source of filament voltage to be described. The electron guns have cathodes 6a, 6b and 6c connected through the plug connector 2a, adapter unit 3b and socket connector 3a respectively to conductors 12a, 12b and 12c associated with current meters and switches to be described. The elecron guns have control grids 8a, 8b and 8c coupled through the plug connector 2a, adapter unit 3b and socket connector 3a to a common conductor 14 extending to a circuit for supplying a source of positive voltage to be connected between a selected control grid and associated cathode, for effecting the flow of rejuvenation current through and from the cathode.

The source of power for the cathode ray tube rejuvenating circuit 1, as illustrated, is a commercial AC supply and, accordingly, there is provided a conventional outlet connecting plug 18 from which extends a pair of conductors 20 and 22 connected respectively to the opposite ends of a primary winding 24a of a step-up transformer 24. The transformer 24 has a secondary winding 24b having a number of tap-off points extending respectively to stationary contacts 26a, 26b and 26c of a control grid voltage selector switch 26 having a wiper 26d adapted to make selective engagement with one of the contacts 26a, 26b and 26c to provide a selection of output voltages. For example, the three tap-off points of the transformer illustrated may give a selection of control grid voltages in the range of from 150–400 volts with respect to chassis ground at 24. Accordingly, one end of a secondary winding 24b is connected to ground and the opposite end is connected to the switch contact 26a providing the highest output voltage. The terminal of the switch wiper 26d is coupled through a suitable rectifier 28, which passes only the positive going portions of the AC signal induced in the secondary winding 24b, to a current-limiting resistor which is preferably an incandescent lamp as shown which may be a 20 watt (at 220 volts) lamp. Such a lamp desirably has a lowest cold resistance and a much higher hot resistance to maximize the initial on-rush of rejuvenating current while providing for a maximum current limiting action after the initiation of such current flow.

The cathode circuits of the various electron guns of the cathode ray tube 2 are completed by connections by the aforesaid conductors 12a, 12b and 12c to respective current indicating meters 36a, 36b and 36c, in turn, connected to stationary contacts 41a, 41b and 41c of respective switches 40a, 40b and 40c. The respective switches 40a, 40b and 40c have first chassis grounded wipers 42a, 42b and 42c normally spring urged in a manner to be described into a position where they are disengaged from respective associated stationary contacts 41a, 41b and 41c. The switches 40a, 40b and 40c respectively have second wipers 43a, 43b and 43c which are normally spring urged into positions where they engage stationary contacts 45a, 45b and 45c. Switches 40a, 40b and 40c are respectively operated by suitable manually operable control members, like depressible push buttons 44a, 44b and 44c operating against respective springs 46a, 46b and 46c. Upon depression of any of these push buttons, the associated chassis grounded wiper 42a, 42b or 42c is moved into engagement with the associated stationary contact 41a, 42b or 41c, and the associated wiper 43a, 43b or 43c is moved out of engagement with the associated contact 45a, 45b or 45c. It is thus apparent that upon depression of any of the push buttons 44a, 44b or 44c, a circuit is established which couples rectified AC positive voltage pulsations to the control grid of the electron gun having its cathode connected through the meter 36a, 36b or 36c and the associated chassis grounded wiper 42a, 42b or 42c, so as to generate an electric field at the latter control grid which will attract electrons from the associated cathode of the cathode ray tube. The associated meter 36a, 36b or 36c will indicate the magnitude of this current which flows as a result of the depression of the push button involved.

In a manner not to be described, prior to the depression of any of the push buttons referred to, heater current is fed to the various heater filaments 4a, 4b and 4c to pre-heat the associated surrounding cathodes 6a, 6b and 6c, in which flow of heater current terminates upon depression of any one of the push buttons. To this end, a heater voltage circuit is provided including a pair of conductors 47–48 extending from the AC outlet plug conductors 20–22. The conductors 48 is shown connected to the bottom end of the primary winding 50a of a filament voltage transformer 50, and the conductor 47 is connected to the wiper 49a of a filament voltage selector switch 49 having a number of stationary contacts 49b, 49c, 49d, etc., all but contact 49b being connected respectively to tap-off points of the primary winding 50a. Thus, as the wiper 49a is progressively moved to different ones of the stationary contacts 49c, 49d, 49e, etc., progressively increasing AC voltages appear across the secondary winding 50b of the transformer 50. When wiper 49a is moved into engagement with the stationary contact 49b, power is disconnected from the filament voltage transformer 50.

As illustrated, one of the ends of the secondary winding 50b of the filament voltage transformer 50 is connected to conductor 12, and the opposite end thereof is connected to wiper 43a of the switch 40a. The associated stationary contact 45a is connected by a conductor 52 to the wiper 43b of the switch 40b. Similarly, the associated stationary contact 45b is connected by a conductor 54 to the wiper 43c of the switch 40c. The stationary contact 45c associated with the wiper 43c is connected to the previously mentioned conductor 10 extending to the parallel connected filaments 4a, 4b and 4c. It is thus apparent that when the wiper 49a of the filament voltage selector switch 49 is connected to any one of the active stationary contacts 49b, 49c, 49d, etc., a voltage will appear at the output of the secondary winding 50b of the filament voltage transformer 50 which will cause the flow of heater current to the heater filaments 4a, 4b and 4c of the cathode ray tube 2. This flow of filament current will heat the associated cathodes 6a, 6b and 6c to a temperature which will cause rejuvenation of a cathode which has less than adequate usable emission upon operation of any of the push buttons 44a, 44b and 44c. Adequate pre-heating of a cathode will normally take place within a matter of for about 10 to 30 seconds.

Generally, a cathode rejuvenation operation is initiated at the lowest voltage necessary to effect rejuvenation to avoid any danger of damage to the cathode ray tube gun involved. Following each rejuvenation operation, an emission test is taken of the cathode involved to determine whether is has been adequately rejuvenated. If not, either another rejuvenation operation at the same voltage is repeated or the switch 26 is advanced to the next position thereof to increase by a limited incremental amount the magnitude of the voltage coupled to the control grid associated with the cathode to be rejuvenated.

The temperature which the heater filaments 4a, 4b and 4c are heated depends, of course,, upon the magnitude of the filament voltage fed thereto. It is generally undesirable to adjust the filament voltage to a level higher than the order of magnitude of from 160% to 200% of the normal filament voltage for the filaments involved. It is preferred to carry out a rejuvenation operation with the filament voltage which is approximately 160% of its normal rating. For example, for a normal 6.3 volt filament voltage, it is preferable to adjust the filament voltage to approximately 10 volts to carry out a preferred rejuvenation operation. This voltage may be achieved, for example, when the wiper 49a of the filament voltage adjusting switch 49 is on the stationary contact 49g. The various tap-off points on the primary winding 50a are primarily for the purpose of providing a wide adjustment of filament voltage, to accommodate the testing and rejuvenation of various cathode ray tubes. Other means than that shown may be used to vary progressively the filament voltage, and a voltmeter 55 connected across the secondary winding 50b preferably indicates the selected filament voltage.

Upon the depression of a push button 44a, 44b or 44c, the heating of the various heater filaments will immediately cease and the positive control grid resulting in cathode to control grid current flow of a waveform determined by the voltage coupled between the selected cathode and control grid, the cooling characteristic of the cathode and the emission quality thereof. It is normally desired that the initial level of rejuvenation current flow between the cathode and control grid of a selected cathode ray gun be of the order of magnitude of about 60–80 milliamps. When the operator sees the current dropping to a selected minimum level, which may be 10 milliamps, he can then release the associated push button.

It should be noted that the prolonged depression of a push button cannot create any hazards which can damage the electron gun involved, since depression of a push button results in the de-energization of the filament voltage circuit. There is, therefore, a minimum risk of damage to the electron gun structures as a result of a rejuvenation process in accordance with the present invention, unlike prior methods wherein there is simultaneously present filament current and the connection of a source of positive voltage between the control grid and cathode of a selected electron gun. Thus, the cooling characteristics of the cathode structures has proven to be an effective timing means for preventing the flow of a large rejuvenation current for a period of time which can damage the electron gun structures involved. Each type of cathode structure, therefore, acts as its own self-limiting circuit element.

It should be understood that numerous modifications can be made in the most preferred circuit described by deviating from the broader aspects of the invention.

I claim:

1. In a circuit for rejuvenating the cathode of a cathode ray tube and including heater filament, cathode and control grid connecting terminals to be connected respectively to the heater filament, cathode and control grid of a cathode ray tube electron gun, a source of positive voltage for said control grid which voltage source when connected between said control grid and cathode heated to a temperature resulting from the flow of a given amount of current through the associated heater filament results in current flow between the cathode and control grid which can effect rejuvenation of the cathode, and a source of heater voltage which when coupled with said heater filament will result in the flow of said given amount of filament current, the improvement comprising first switch means having a first condition for connecting said source of heater voltage to the heater filament connecting terminals and a second condition for disconnecting said source of heater voltage therefrom, second switch means having a first condition for disconnecting said source of positive voltage from said cathode or control grid connecting terminal and a second condition for connecting said source of positive voltage thereto so the source of positive voltage is connected between said cathode and control grid to cause an electron attracting field at said control grid, said first and second switch means being maintainable in only said first or second conditions at the same time so a sustained flow of heater current and a sustained connection of said source of positive voltage between the said cathode and control grid cannot occur simultaneously, and switch operating means for selectively operating said first and second switch means simultaneously in said first or second conditions.

2. The circuit of claim 1 wherein said switch operating means comprise a single manually operable control member selectively for operating said first and second switch means simultaneously to said first or second conditions.

3. The circuit of claim 1 wherein the switch operating means includes manually operable means and there is provided current level indicating means in the path of current flow from said control grid and cathode connected terminals, whereby the operator can operate said first and second switch means in said second condition for a sufficient period that current flow from the cathode and control grid connecting terminals will increase to a given maximum value and then decrease to a given minimum value.

4. The circuit of claim 1 wherein said manually operable switch means is a single manually engagable control member spring urged into a position where said first and second switch means are both operated in said first condition and which when operated against the spring force involved simultaneously operates the associated first and second switch means into said second condition thereof.

5. In a circuit for rejuvenating the cathode of a selected electron gun of a color cathode ray tube, said circuit including heater filament, cathode and control grid connecting terminals to be connected to the various heater filaments, cathodes and control grids of the electron guns, a source of positive voltage for the control grids of said electron guns which voltage source when connected between a control grid and associated cathode heated to a temperature by the heat generated by the flow of a given amount of current through the associated heater filament results in current flow between such cathode and control grid which can effect rejuvenation of the cathode, and a source of heater voltage which when coupled to one of said heater filaments results is the flow of said given amount of filament current through said heater filament, the improvement comprising first switch means having a first condition for connecting said source of heater voltage to said heater filaments of said electron guns and a second condition for disconnecting said source of heater voltage therefrom, a separable operable second switch means associated with each of said electron guns and having a first condition for disconnecting said source of positive voltage from said cathode or control grid connecting terminals for the associated electron gun and a second condition for connecting said source of positive voltage thereto to provide an electron attracting field at said control grid, said first and second switch means being maintainable in only said first or second conditions at the same time so a sustained flow of heater current and a sustained connection of said source of positive voltage between the cathode and control grid of a selected electron gun cannot simultaneously occur, and switch operating means for simultaneously operating said first and second switch means to said first and second conditions.

6. The circuit of claim 5 wherein said switch operating means comprise individual manuable operable means selectively for operating the first and second switch means associated with a particular electron gun simultaneously to said first or second conditions, and there is provided current level indicating means in the path of current flow between the control grid and cathode connecting terminal means for a selected electron gun, whereby the operator can operate said first and second switch means in said second condition for a sufficient period so that current flow between the cathode and control grid connecting terminals means decrease from a given maximum value to a given minimum value.

7. The circuit of claim 6 wherein said manually operable switch means associated with each electron gun includes a single manually engagable control member spring urged into a position where said first and second switch means for a selected electron gun are both operated in said first condition and which when operated against the spring force involved simultaneously operates the associated first and second switch means into said second condition thereof.

8. A method for rejuvenating the cathode of an electron gun of a cathode ray tube including a heater filament, a cathode and a control grid, the cathode rejuvenation occuring when the cathode is heated to a rejuvenation temperature and a cathode current is drawn therefrom by application of a source of relatively high positive voltage between the control grid and cathode, said method comprising the steps of: connecting a source of heater filament voltage to the heater filament to heat the same so as to cause heating of the associated cathode to said rejuvenating temperature while said source of positive voltage remains disconnected from between said control grid and cathode, and then simultaneously disconnecting said source of heater filament voltage from said heater filament and connecting said source of positive voltage between said control grid and cathode for a period of time necessary to effect cathode rejuvenation.

9. The method of claim 8 wherein said source of positive voltage is connected between said control grid and cathode while said source of heater filament voltage remains disconnected from the associated filament for a period of time where current flow between said cathode and control grid decreases from an initially high value below a given minimum predetermined value.

* * * * *